No. 854,664. PATENTED MAY 21, 1907.
C. J. McMASTER.
WIND MOTOR.
APPLICATION FILED JUNE 15, 1906.

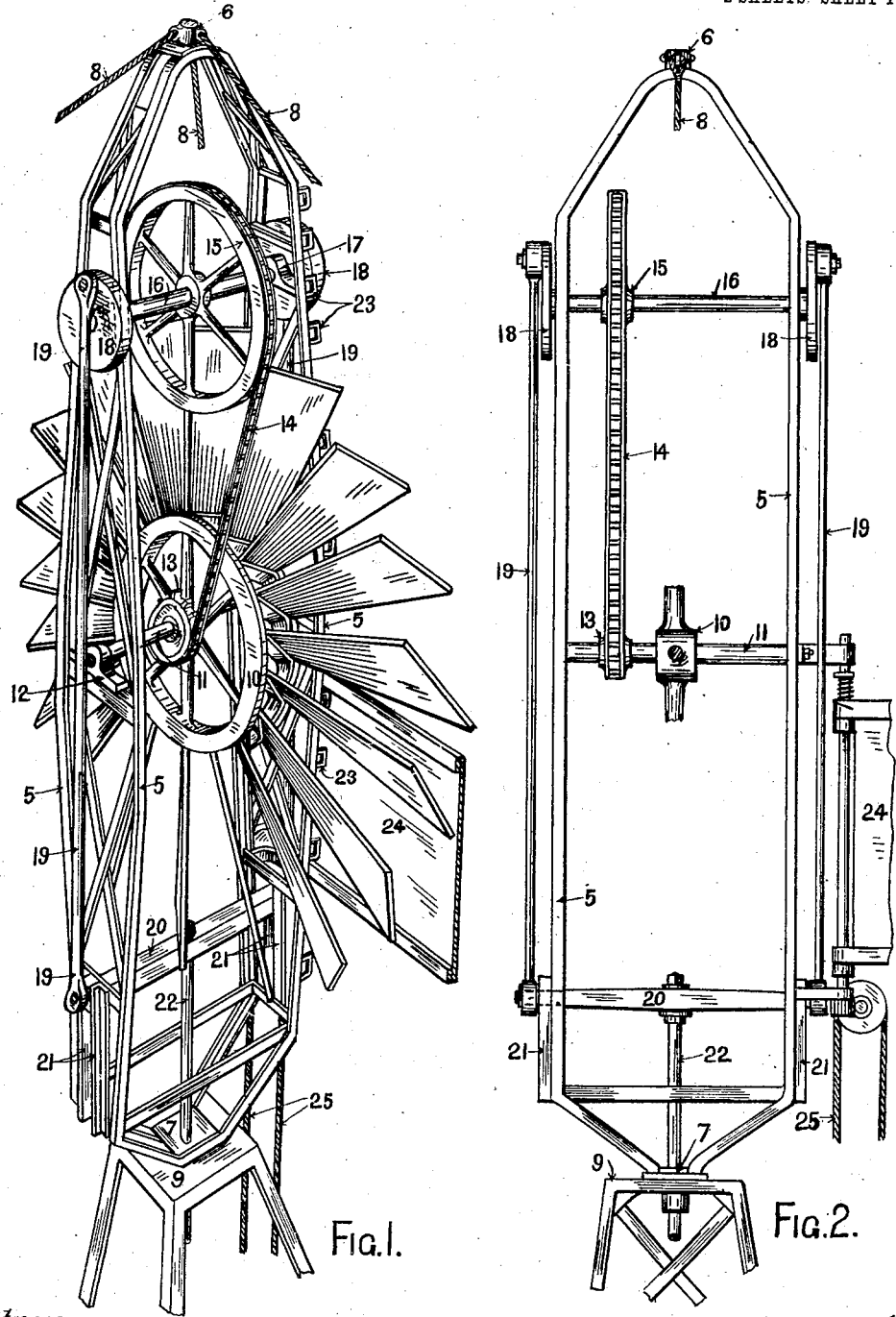

2 SHEETS—SHEET 2.

Witnesses Inventor

UNITED STATES PATENT OFFICE.

CATHERINE JANE McMASTER, OF CORFIELD, NORTH QUEENSLAND, QUEENSLAND, AUSTRALIA.

WIND-MOTOR.

No. 854,664.          Specification of Letters Patent.          Patented May 21, 1907.

Application filed June 15, 1906. Serial No. 321,901.

*To all whom it may concern:*

Be it known that I, CATHERINE JANE McMASTER, a subject of the King of Great Britain and Ireland, residing at Corfield, North Queensland, in the State of Queensland, in the Commonwealth of Australia, have invented certain new and useful Improvements in Wind-Motors; and I do hereby declare the following to be a full, clear, and exact description of the invention, such as will enable others skilled in the art to which it appertains to make and use the same.

This invention relates to a wind motor, consisting of a wind wheel of ordinary construction and a peculiarly constructed head frame in which the same is mounted.

The invention further relates to the transmission means whereby the motion of the wind wheel can be communicated to a driven mechanism. But in order that this invention may be clearly understood reference will now be had to the accompanying drawings in which:—

Figure 3:
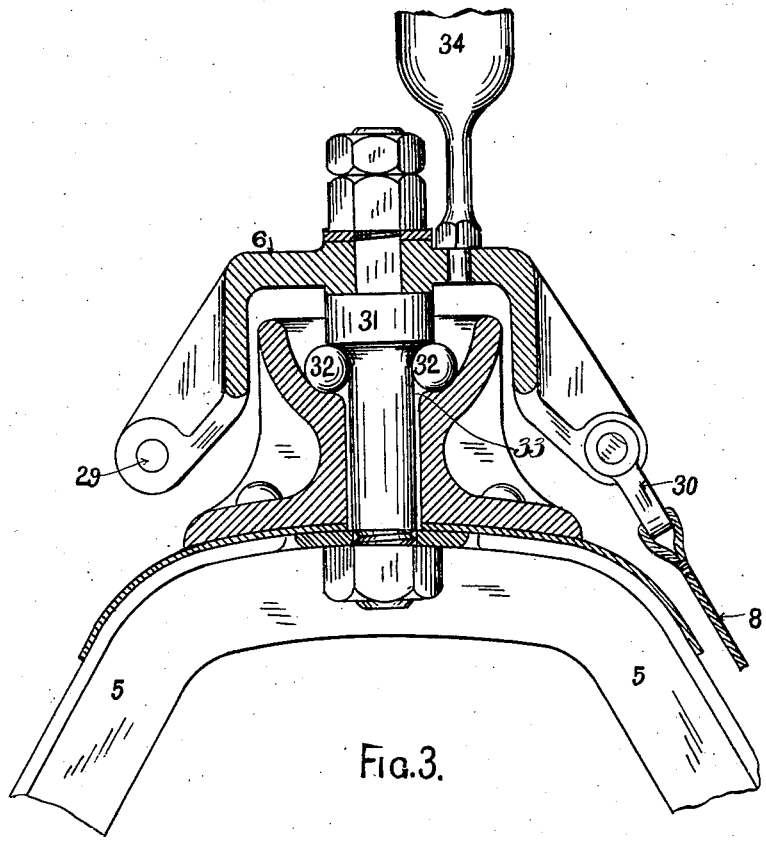
Figure 4:
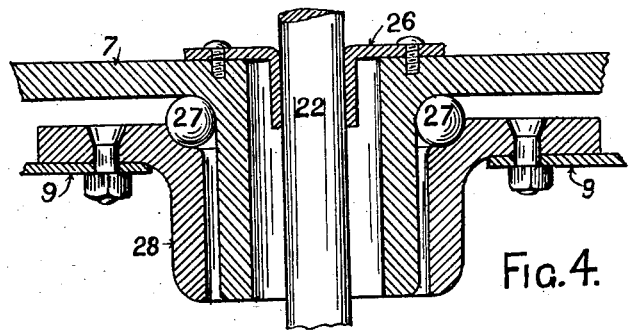

Figure 1 is a perspective view of a wind motor. Fig. 2 is an elevation of same. Fig. 3 is an enlarged sectional view of the top swivel. Fig. 4 is a similar view of the foot bearing.

The frame 5 which may be of any suitable construction consists of side pieces jointed together at the top and bottom and suitably stayed and is pivoted between the top swivel 6 and foot bearing 7. The swivel 6 has guy ropes 8 which are fastened to stakes in the ground or in any other suitable way according to circumstances. The foot bearing 7 rests on a platform supported by standards 9 or on any other suitable structure.

Supported between the side pieces of the frame 5 on bearings 12 is the spindle 11 on which is keyed the fan wheel 10.

13 is a sprocket wheel having a chain 14 gearing with another sprocket wheel 15 on a spindle 16 in bearings 17, having also two cranks 18 with connecting rods 19 to cross head 20, sliding in guide bars 21, said cross head having a plunger rod 22 connected to a pump or other mechanism. The frame 5 has ladder rungs 23 and the ordinary tail 24 with the usual appliances for throwing it out of action by means of ropes 25. The foot bearing 7 has a leather guide washer 26 for the plunger rod 22 and bears upon balls 27 in a ball race 28. The swivel 6 has eyeholes 29 for shackles 30 for the guy ropes 8.

31 is a spindle which bears on balls 32 in a race way 33 which is bolted to the top of the frame 5.

34 is an oil cup.

What I claim and desire to secure by Letters Patent is:—

1. A wind motor comprising a head frame having an apertured foot bearing, a platform on which the head frame is pivotally supported, a swivel pivotally connected to the head frame, guy ropes attached to said swivel, bearings in said head frame, a wind wheel mounted in said bearings, other bearings in the head frame, a shaft mounted in said second mentioned bearings, means for transmitting motion from the wind wheel to the shaft, a crank for said shaft, guides in said head frame, a cross head reciprocating in said guides, a crank shaft connecting said crank and cross head and a plunger passing through the apertured foot bearing.

2. A wind motor, comprising a head frame having an apertured foot bearing, a platform, a ball race in said platform, balls in said race, a bearing part on said head frame engaging said balls, a swivel, a central shouldered pin on said swivel, a ball race on the head frame, balls engaging said race and the shoulder of said pin, bearings in said head frame, a wind wheel mounted in said bearings, other bearings in the head frame, a shaft mounted in said second mentioned bearings, means for transmitting motion from the wind wheel to the shaft, a crank for said shaft, guides in said head frame, a cross head reciprocating in said guides, a crank shaft connecting said crank and cross head and a plunger passing through the apertured foot bearing of the head frame.

3. A wind motor comprising an apertured head frame, a supporting platform therefor, a ball race in said platform, balls in said race, a bearing part on said head frame engaging said balls, a swivel, a shouldered pin for said swivel, a ball race on the head frame, balls engaging said race and the shoulder of said bearings in the head frame, a wind wheel mounted in said bearings, other bearings in the head frame, a shaft mounted in said second mentioned bearings, means for transmitting motion from the wind wheel to the shaft, a crank for said shaft, guides in the head frame, a cross head reciprocating in said guides, a crank shaft connecting said crank and cross head, a plunger passing through the aperture in said head frame, and a tail piece for the head frame.

In testimony whereof, she affixes her signature, in presence of two witnesses.

CATHERINE JANE McMASTER.

Witnesses:
    WALTER SIGMONT,
    W. S. RATTRAY.